(12) United States Patent
Weber et al.

(10) Patent No.: US 6,923,248 B1
(45) Date of Patent: Aug. 2, 2005

(54) COOLING COVER, COOLING COVER COMPONENTS AND COOLING TUBULAR ARMATURE

(76) Inventors: Reiner Weber, Karl-Valentin-Strasse 20, Neuoetting (DE) D-84624; Michael Schwendemann, Sudetenstrasse 8a, Kolbermoor (DE) D-83059

( * ) Notice: Subject to any disclaimer, the term of this patent is extended or adjusted under 35 U.S.C. 154(b) by 0 days.

(21) Appl. No.: 09/254,743
(22) PCT Filed: Sep. 11, 1997
(86) PCT No.: PCT/EP97/04987
§ 371 (c)(1), (2), (4) Date: May 28, 1999
(87) PCT Pub. No.: WO98/11390
PCT Pub. Date: Mar. 19, 1998

(30) Foreign Application Priority Data

Sep. 11, 1996 (DE) ................................ 196 36 944

(51) Int. Cl.$^7$ ............................................. F24D 3/16
(52) U.S. Cl. ........................................ 165/56; 165/169
(58) Field of Search ........................... 165/53, 56, 169, 165/170, 49

(56) References Cited

U.S. PATENT DOCUMENTS

| | | | | |
|---|---|---|---|---|
| 1,771,269 A | * | 7/1930 | Musgrave et al. ............. | 165/56 |
| 2,660,409 A | * | 11/1953 | Pittenger, Jr. et al. ........ | 165/56 |
| 2,782,006 A | * | 2/1957 | Frenger ........................ | 165/56 |
| 4,205,719 A | * | 6/1980 | Norell et al. .................. | 165/49 |
| 4,619,801 A | * | 10/1986 | Engel ........................... | 165/56 |
| 4,941,528 A | * | 7/1990 | Herbst .......................... | 165/56 |

FOREIGN PATENT DOCUMENTS

| | | | | |
|---|---|---|---|---|
| DE | 3243768 | * | 5/1984 | ................. 165/56 |
| DE | 3500880 | * | 8/1985 | ................. 165/56 |
| GB | 2089492 | * | 6/1982 | ................. 165/56 |
| GB | 2271174 | * | 4/1994 | ................. 165/56 |

* cited by examiner

Primary Examiner—Stephen M. Hepperle
(74) Attorney, Agent, or Firm—Townsend and Townsend and Crew LLP

(57) ABSTRACT

The present invention concerns a cooling cover (10) comprising cooling tubular armatures (34) applied against said cooling cover or against an existing cover. The cooling cover is characterized by a sandwich-type assembly of dry-process manufactured upper and lower firestop plates (16, 26) of gypsum plasterboard or plaster mold, separated by spacers (22) so as to form plane cavities (24) where the cooling tubular armatures (16) are situated, the upper plates (16) preferably being provided with a firestop spacer or a heat reflecting layer, for instance an aluminum foil. In an other embodiment, the tubes of the cooling armature are embedded in a sealing material, resulting in a plate being placed either against the lower surface of the dry-process manufactured upper plates or against segments of this surface.

16 Claims, 4 Drawing Sheets

COOLING COVER, COOLING COVER COMPONENTS AND COOLING TUBULAR ARMATURE

BACKGROUND OF THE INVENTION

1. Field of the Invention

The present invention relates to a cooling ceiling consisting of cooling tube mats, in particular plastic cooling tube mats, which are attached or attachable to a bare ceiling, or to an existing ceiling, by means of a carrier system, and also relates to an element and to a cooling tube mat for use in such a cooling ceiling.

2. Description of the Prior Art

Cooling ceilings of the above-named kind are principally used, in known manner, in multiple stores, offices and larger buildings. The aim exists to cool the rooms, above all in summer and for this, two different system are known in principle which offer an alternative to air conditioning. In air conditioning, the room air is continually circulated and cooled to a preselectable temperature. Such air conditioning systems are relatively complicated, require regular servicing and as a rule, cause noise and can lead to an undesired transmission of germs.

In a cooling ceiling of the initially named kind, a liquid is transported with the aid of cooling tubes, i.e. of cooling mats, which serves for a cooling of the warm air which rises to the level of the ceiling and which then falls downwardly again as cold air. After a certain time the cooled temperature is basically radiated downwardly. The advantage in comparison with customary air conditioning systems relates to almost service-free operation and cooling of the space without noise arising.

Known are cooling ceilings consisting of cooling tubes which are delivered in mat form and are used in connection with metal ceilings.

Known is also the use of plastic cooling mats which are subsequently plastered over.

Despite the advantages of cooling ceilings, the above-named system also has disadvantages.

In the system in which the cooling mats and cooling pipes are used in connection with metal ceilings, there is a high cooling loss upwardly. The cooling action which is to be achieved is basically radiated upwardly to too great an extent.

In the second variant, in which the cooling mats are subsequently plastered over, the installation is tied to a greater degree to the constructional circumstances. Through the laying of cooling mats in plaster, the danger also exists of condensation arising which has the consequence that the cover layer separates from the cooling mats, or tears, or that ugly spots arise. Moreover, in both of the above-named systems hindering, of the building progress and other works is unavoidable.

SUMMARY OF THE INVENTION

The object of the present invention is to provide a cooling ceiling construction which has a high degree of efficiency in operation, which enables a very flexible building progress, offers many possibilities for lighting and installation, preferably achieves a fire protection of at least F 30 without the need to check the lower ceiling, can be installed in high rooms at the desired level, for example in old buildings, without additional lower ceilings, can be used as a carrier for sound insulating plasters or paints, and enables a saving of the calculated cooling mat area to be achieved.

In order to satisfy this object, in accordance with the present invention in a cooling ceiling of the initially named kind, in a first variant, a sandwich construction is provided with upper and lower dry building panels, in particular fire resistant dry building panels such as sandwich-type plaster board panels or gypsum fiber board panels which are spaced apart from one another by spacers to form shallow hollow cavities, with the cooling tube mats being located in the hollow cavities and the upper panels preferably being provided with a thermal barrier and/or a thermally reflecting layer, for example a foil of aluminium.

Likewise for the solution of this object, in accordance with the present invention, in a cooling ceiling of the initially named kind, in a second variant, the carrier system consists of a plurality of dry building panels, in particular fire resistant dry building panels such as sandwich-type plaster board panels or gypsum fiber board panels, which are assembled together into an areal arrangement, in that the individual cooling tube mats arranged in groups or in a matrix form are accommodated beneath the surface formed by the dry building panels, or in cut-outs within the dry building panels, and are optionally carried by the latter, with the cooling tube sections of the cooling tube mats which extend parallel to one another being embedded, at least in their upper regions, in a material which fills out the hollow cavities between the tubes, or being at least partly accommodated in grooves in the lower side of the dry building panels, with the grooves having a cross-sectional shape complementary to the cross-sectional shape of the upper side of the tubes, and wherein the connections to the cooling tube mats are led upwardly and are connectable to one another above the dry building panels and are connectable to outflow and supply tubes for the liquid coolant.

The cooling ceiling of the present invention is thus a construction which can be manufactured in dry building manner. It is assembled from building elements which are known per se and which are available at a favorable price in sizes which are easy to handle. Thus the building progress is not impaired by the installation of a cooling ceiling. This installation is in principle no more complicated than the installation of a normal built-in ceiling.

Since this is a dry method of construction, there are hardly any restrictions with respect to lighting and installation. Cables can be laid loosely on the upper side of the ceiling or in open cable channels and can be led through the cooling ceiling at positions where no cooling mats are present. When using fire resistant dry building panels, in particular sandwich-type plaster board or gypsum fiber panels no difficulties exists in achieving a fire protection of F 30. Moreover these panels can be straightforwardly provided with acoustic plaster, wallpaper or coats of paint, particularly since no transitions are visible.

Through the more flexible suspension of the cooling ceiling, up to 10% of the calculated cooling mats can spared since, for example, the finished ceiling height can be calculated individually for each room.

Embodiments of the present invention provide advantages. For example, after completion of the hanger construction and the attachment of CD sections to the individual hangers the upper panels can be attached to the CD sections by means of rapid construction screws. The aluminium foil, which is preferably provided, is preferably previously laminated onto the lower sides of the upper panels. This can, however, optionally take place after the mounting of the upper panels. Then the bars, for example in the form of plaster bars which are available at a favorable price and which are intended to serve as spacers, are secured to the upper panels by means of further rapid construction screws. Thereafter the cooling mats are inserted into the hollow cavities between the bars and are held in the so-formed hollow cavities by the attachment of the lower dry building panels, with the lower dry building panels likewise being secured by means of rapid construction screws at the positions of the spacers and with the rapid building screws being able to pass both through the plaster bars as well as through the upper dry building panels and optionally the CD sections of the carrier system. Thereafter it is only necessary, if desired, to fill in or tape over the gaps between the lower dry building panels. If desired an acoustically insulating fleece can be provided at the upper side of the lower dry building panels or can be attached in the form of a wallpaper to the lower side of the lower dry building panels.

A cooling ceiling of a second variant of the invention, in which the tubes of the cooling tube mats are embedded in a material, has the special advantage that the embedding material on the one hand represents an insulation towards the top, so that the cooling tube mats can be accommodated in cut-outs of the surface without upper dry building panels without having to fear a pronounced cooling loss upwardly. Moreover, with a construction of this kind, a ceiling is produced which has essentially only the thickness of one dry building panel, even when the cooling tube mats have an increased thickness in order to obtain better insulation, with the weight of the ceiling construction being relatively small. The lower side of the cooling ceiling then presents itself either as a continuous closed surface (after the closing of the transitions between the dry building panels and between the dry building panels and the cooling tube mats, which in the manner previously known for dry building panels can take place by means of tapes and optionally with a filler composition), and this ceiling can if required be painted or papered or provided with a coating, for example of a glass fabric and/or of spray plaster. The cooling tubes can, if desired, have a flattened surface of the bottom which ensures a better cooling action downwardly and moreover enables a flat design of the lower side of the cooling ceiling, or they can, for example, have a circular or polygonal cross-section which is only embedded up to a half height in the embedding material, with the downwardly projection regions of the cooling tubes taking care of a decorative structuring of the lower side of the cooling ceiling, i.e. being capable of being used as a design feature. This variant has, however, also the advantage that the exposed surface of the cooling tubes is even larger relative to the flattened version, whereby the cooling action is increased still further. This increase of the cooling action signifies in turn that one can operate with lower temperature differences—whereby the danger of condensation is reduced—and/or can operate with a lower flow speed of the coolant, whereby the flow noises are reduced.

Since the upper sides of the tubes and of the cooling mats are embedded in the embedding material an air circulation cannot take place here, so that the danger of the formation of condensation in this area is small.

In arrangements, in which the cooling tubes are not covered over towards the bottom—or are at most covered with a paint layer or a thin coating—the danger of condensation is in any event low, because the normal air circulation at relatively low temperature differences prevents the formation of condensation.

These advantages can also be achieved when the cooling tube mats are attached beneath the dry building panels and for example adhesively bonded to them. When embedding the cooling tubes and the cooling tube mats in an embedding material the arrangement can be bonded over the full area or only locally to the dry building panels or, for example, rapid construction screws at specific points can also serve for an attachment.

If the cooling tube mats consist solely of tubes arranged parallel to one another which are arranged in grooves in the lower side of the dry building panels then a bonded arrangement can also be effected in these grooves.

It is however also possible to accommodate the cooling tube mats between two layers of dry building panels in a sandwich construction. In this case the cooling tube mats with embedding material are arranged in shallow hollow cavities between upper and lower dry building panels and fully fill out these low cavities. Alternatively cooling tube mats formed simply from cooling tubes arranged parallel to one another can be so arranged that the tubes are arranged in grooves formed in the upper and/or lower dry building panels, with the tubes preferably fully filling out these grooves in order to largely avoid air movements in this region and thus the formation of condensation.

DESCRIPTION OF THE PREFERRED EXEMPLARY EMBODIMENTS

Figure 1:
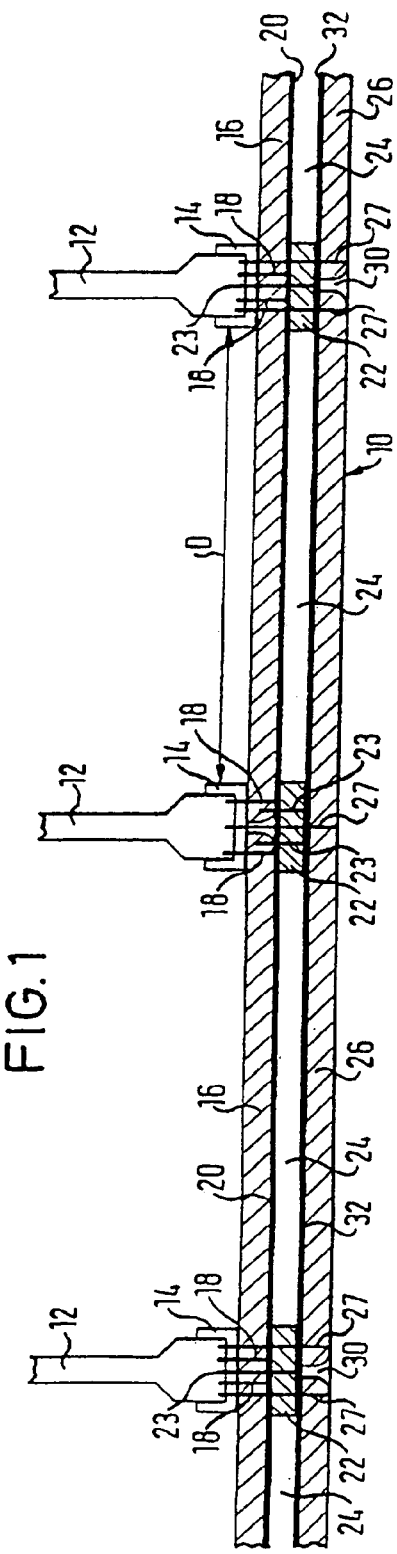
FIG. 1 is a schematic cross-section through a first embodiment of the invention.

FIG. 1 shows a part cross-section through a cooling ceiling 10, which is executed in this example as a suspended ceiling. For this hangers 12 are provided which can be secured to a bare ceiling or to an old ceiling. Below these hangers there are located so-called CD sections 14 which serve as carrier rails and which are well known per se, as also are the hangers. In this example the spacing (center-to-center spacing) D from carrier rail to cater rail amounts to a maximum of 625 mm. Sandwich-type plaster board panels 16 with dimensions of 2000 mm length, 1250 mm width and 12.5 mm thickness are secured to the CD ceiling sections 14 from below with the aid of rapid construction screws 18. These have, for example, a length of 25 mm. The invention is not restricted to these preferred dimensions, as quoted. Boards with other dimensions can be used, for example, board thicknesses in the customary range from 9.5 mm to 18 mm can be straightforwardly selected.

An aluminium foil 20 is secured to the lower side of the boarding formed by the sandwich-type plaster board panels 16 and is self-adhesively overlapped at the longitudinal joints.

This aluminium foil acts as a thermal barrier, but also as a vapor barrier in accordance with the invention.

Spacers 22 are arranged beneath the aluminium foil with a clear spacing of a maximum of 50 cm and this attachment can be achieved by adhesive bonding or by rapid construction screws 23. In the latter case the rapid construction screws are screwed through the spacers into the upper sandwich-type plaster board panels 16 and, if desired, also into the CD sections. The spacers are realized here in the form of long strips of sandwich-type plaster board panels or strips of gypsum fiber board panels (simply named plaster bars in the following), which are arranged parallel to one another. It would also be conceivable to use shorter plaster bars which should then be laid out at the node points of a square pattern. The use of longer bars is however preferred because this facilitates the attachment of the lower sandwich-type plaster board panels.

Hollow spaces 24 are formed between the plaster bars 22 and beneath the sandwich-type plaster board panels 16, i.e. beneath the aluminium foil 20, in which cooling tube mats can be received (not shown in FIG. 1). These cooling tube mats, which preferably consist of plastic, are commercially available and are in this example provisionally secured in the hollow spaces 24 during the insulation of the cooling mats and indeed by means of a two-sided adhesive tape. After attachment of the plaster bars 22 and the cooling mats a second boarding, likewise consisting of sandwich-type plaster board panels 26 with dimensions of 2000 mm length, 1250 mm width and 12.5 mm thickness are secured with the aid of rapid construction screws at the positions of the plaster bars 22. These dimensions are also only preferably quoted here. A sound insulating fleece 32 of 2 mm thickness is located on these lower sandwich-type plaster boards 26, preferably on the top side, and can for example be adhesively bonded to the sandwich-type plaster boards 26 for example at the construction site, and causes the introduced cooling tube mats to directly contact the first boarding, i.e. the aluminium foil 20. The sound insulating fleece presses against the lower side of the cooling tube mats and prevents free hollow cavities arising which could lead to refrigeration losses and vibrations at the ceiling. The joints 30 formed between the abutting panel sides of the lower sandwich-type plaster boards 26 are filled in with joint filling composition with the insertion of a joint tape, so that from the bottom a continuous ceiling is visible. As can be seen from FIG. 1 the lower panels 26 are offset by the half width relative to the upper panels. This is favorable with regard to the behaviour in the case of fire but is not however compulsory.

It should be emphasized that not every hollow space 24 has to be provided with a cooling tube mat, but rather some hollow spaces 24 can be left free and the lighting can be installed in these left free regions, for example in a regular pattern.

One notes that with the dimension selected here the rapid construction screws 27 which are used to secure the lower sandwich-type plaster boards 26 to the upper construction are screwed into the CD sections 14 and there directly secure the lower sandwich-type plaster boards to the CD sections. Plaster bars (not shown) can optionally be provided between them. The selected dimensions ensure in other respects that the spacers are preferably arranged at the positions of the CD sections and, with plaster bars of 125 mm width, each second plaster bar bridges the joint between two lower panels 26 and hollow spaces of 50 cm thereby arise, which are favorable for the mounting of the cooling tube mats. With the upper panels the joints between two respective adjacent panels are also bridged by the spacers, which turns out to be very favorable with respect to the behaviour in the case of fire.

In order to facilitate the fixing of the rapid construction screws the lower sandwich-type plaster boards 26 can be provided with corresponding markings at the positions for the rapid construction screws, for example by drawn-in lines or by a printed on template pattern.

In this example the plaster bars 22 can already be secured to the upper sandwich-type plaster board panels 16 at the manufacturers, with the aluminium foil then either being provided only between the bars or also being applied as a continuous foil to the lower side of the bars.

With this type of construction the cooling ceiling consists of the following elements:

a) of upper dry building panels 16 with a thermal barrier 20 secured thereto, for example in the form of aluminium foil (with the thermal barrier 20 preferably being attached to the lower side of the upper dry building panels), b) of spacers 22 which are attachable to the lower side of the upper dry building panels 16, which are optionally already attached to the upper panels during their manufacture, c) of lower dry building panels 26 which are attachable to the spacers 22 in order to form the hollow cavities 24 which receive the cooling tube mats 34, and d) optionally a sound insulation 32, preferably in the form of a sound insulating fleece 32 which is either attachable between the spacers 22 at the upper side of the lower panels 26 or is attachable in the manner of a wallpaper to the lower side of the lower panel 26.

Figure 2:
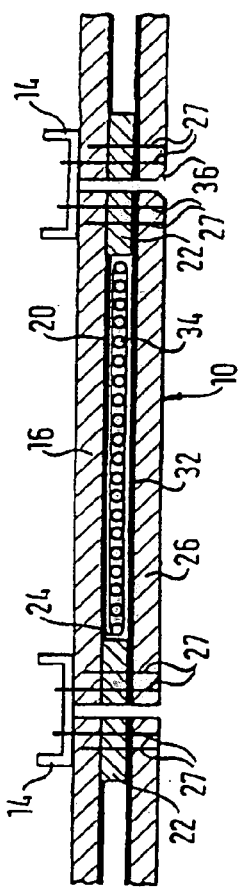
FIG. 2 is a schematic cross-section through a second-embodiment of the invention.

FIG. 2 shows an alternative embodiment of a cooling ceiling loin which the same parts are provided with the same reference numerals. Here the lower sandwich-type plaster board panels 26 are arranged in alignment with the upper sandwich-type plaster board panels 16 and in each case one upper sandwich-type plaster board panel and one lower sandwich-type plaster board panel forms an element by means of two spacers 22 and rapid construction screws 27. Here an aluminium foil as a thermal barrier is also provided on the lower side of the upper sandwich-type plaster board panel 16 and the sound insulation fleece 32 is provided as thermal insulation above the lower sandwich-type plaster board panel 26. In the hollow space 24 formed between the panels 16 and 26 there is located a cooling tube mat 34 which, in this element, is either placed into the hollow space 24 during manufacture prior to the attachment of the lower sandwich-type plaster board panel 26 or can also be pushed from the side into the hollow space after the completion of the element.

Since, in this example, an element consisting of two sandwich-type plaster board panels would threaten to be somewhat heavy and difficult to handle, the width dimension of the sandwich-type plaster board panels is halved so that the gaps between the individual elements in this example come to light precisely at the positions of the CD sections. The elements can however certainly have other dimensions and the arrangement of the hangers can be correspondingly selected.

The embodiment of FIG. 2 also shows that it is not absolutely essential to fill in the gap between the neighbouring elements. The gaps can also be left open in the manner of a shadow joint.

It is shown at 36 that the edges of the lower sandwich-type plaster board panels 26 can be chamfered in order to produce a pleasing optical pattern in a joint area.

In order to improve the behaviour in the case of fire the individual elements of this design can be formed with grooves at two sides and tongues at the other two sides, so that in the finished cooling ceiling each joint is bridged by a fire retarding tongue.

Figure 3:
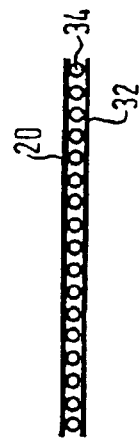
FIG. 3 is a schematic cross-section through a cooling tube mat in accordance with the invention.

Finally FIG. 3 shows a cooling tube mat in accordance with the invention which is provided at the upper side with an aluminium layer, for example in the form of aluminium foil and at the lower side with a sound insulation, for example in the form of a sound insulating fleece 32.

Although the above described embodiments are principally described using sandwich-type plaster board panels which, at least in the constructional form of FIG. 1, allow a fire protection factor of F 30 to be achieved, other dry building panels can be straightforwardly used for example so-called gypsum fiber panels. The dimensions of the individual elements can also be selected as desired. Furthermore it is not essential that the mounting takes place via hangers and CD sections. The elements of the cooling ceiling can also be secured either directly to a bare ceiling or to an old ceiling or can be secured via a lath arrangement to such ceilings.

Further variants of the invention will be explained in the following with reference to the further FIGS. 4 to 13.

Figure 4:
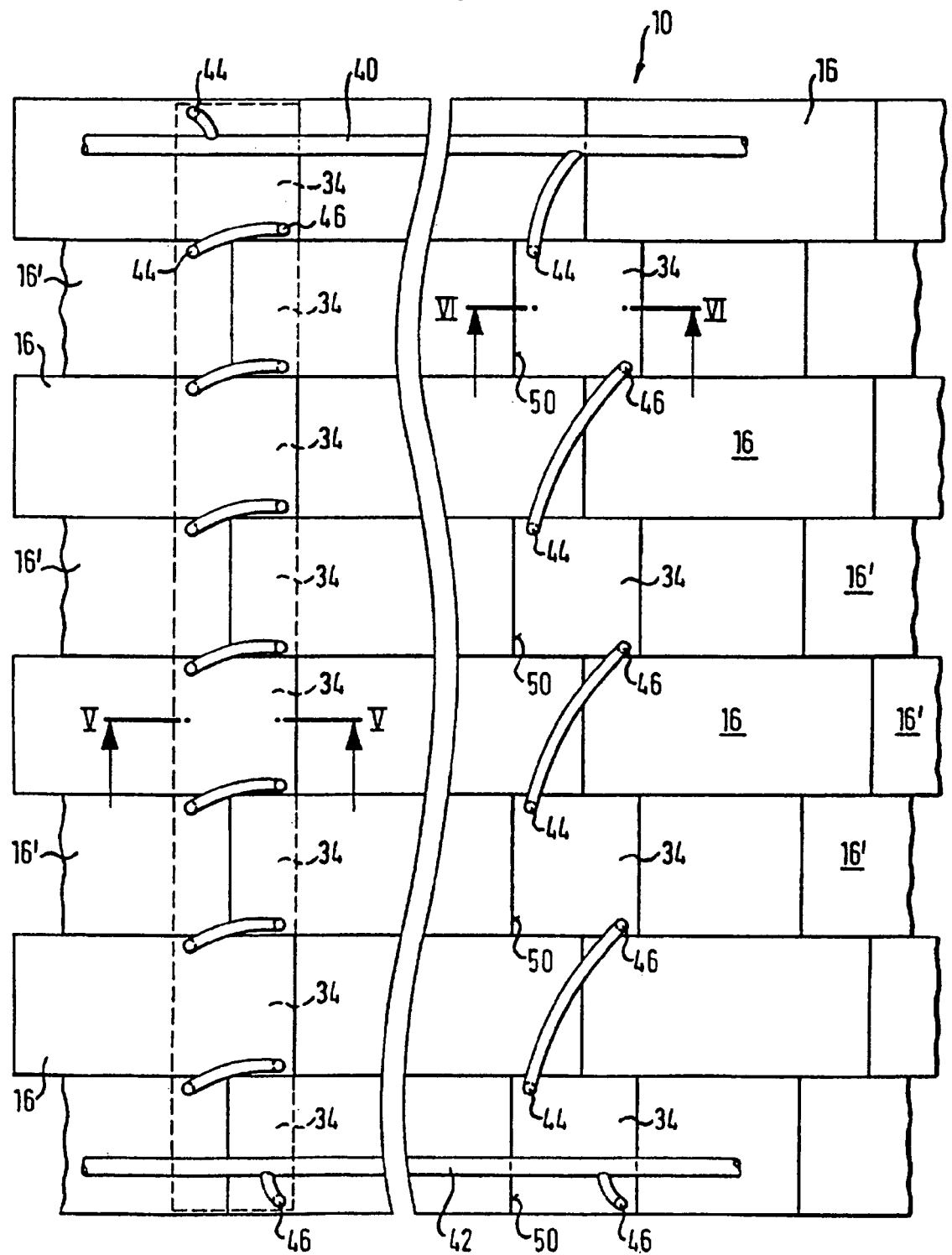
FIG. 4 is a schematic plan view of two variants of the cooling ceiling in accordance with the invention and indeed a plan view from above, not from below.

As was brought to expression above FIG. 4 shows a plan view onto the top side of a cooling ceiling 10 and indeed in two different variants which are shown to the left and right in FIG. 4. The two curved parallel lines at the center of FIG. 2 which go from the top to the bottom represent a conceptual separation between the two variants. For both variants upper dry building panels 16 are however laid alongside one another in accordance with a specific pattern. The dry building panels 16 are offset relative to one another in the individual rows in similar manner to a brick wall. The degree of the offset is not critical. Other patterns can however also be straightforwardly selected. The precise arrangement of the upper dry building panels 16 is not important. An arrangement should however be selected which straightforwardly enables the amounting of the dry building panels on CD ceiling sections for example. In order to fix the positions of the screws the panels can have markings, for example printed markings. In FIG. 4 curved lines are also used in order to characterize dry construction panels 16' which have been broken away for the purpose of the illustration.

At the left hand side of FIG. 4 there is a group of a total of eight cooling tube mats 34 combined into an elongate group. These cooling tube mats are arranged beneath the dry construction panels, which is why the side edges are simply shown with broken lines. This is not possible for each side of the cooling tube mats of the series at the right hand side because the corresponding sides of the cooling tube mats lie beneath the joints between adjacent dry construction panel 16.

A supply tube and a discharge tube are shown by the reference numerals 40 and 42. It can be seen from the illustration at the left in FIG. 4 that the connection 44 of the uppermost cooling tube mat 44 in FIG. 4 is connected to the supply tube 40 while the discharge connection 46 of the same cooling tube mat is connected to the supply connection 44 of the lower lying cooling tube mat. This type of cross connection repeats for all the cooling tube mats and to the lowest cooling tube mat 34 in FIG. 4 the discharge connection 46 of which is connected to the discharge tube 42.

The arrangement shown indicates that the cooling tubes of the individual cooling tube mats 34 are led in narrow loops within the individual cooling tube mats. It is however also possible to arrange a distributor tube at two ends of each cooling tube mat, with the cooling tubes then extending strictly parallel to one another between the distributor tubes.

An alternative arrangement of the cooling tube mat is shown at the right hand side of FIG. 4. Here these are namely provided within cut-outs 50 between the dry construction panels. In this case the supply connections 44 and the discharge connections 46 of the individual cooling tube mats are visible. It can also be seen here that the series of cooling tube mats 34 is connected to the supply tube 40 and to the discharge tube 42.

After the explanation of the two different basic arrangements at the left and right hand side of FIG. 4 both basic arrangements will be explained in more detail and various variants will be explained with reference to the further Figures.

In all Figures the same reference numerals also indicate the same parts. In some Figures individual parts have been omitted in order to simplify the illustration.

Figure 5:
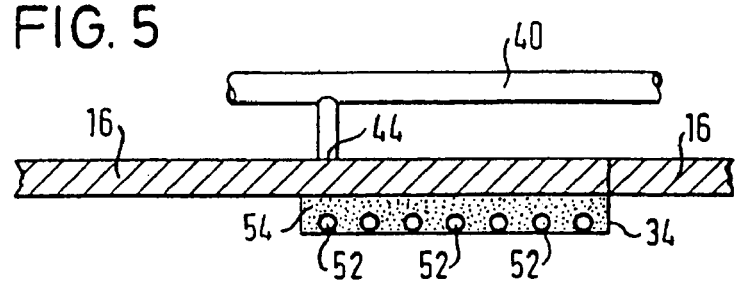
FIG. 5 is a section in accordance with the arrow V—V of FIG. 4.

FIG. 5 shows a section through the arrangement at the left hand side of FIG. 4, and indeed in accordance with the section plane V—V. Two parts of two neighbouring upper dry construction panels 16 are evident from FIG. 5 as well as the cooling tube mat 34 arranged beneath them. In this section drawing the individual tubes 42 of the cooling tube mats can also be recognized. It can also be seen that the cooling tubes 52 of the cooling tube mats are embedded in an embedding material 54 and that the so-formed cooling tube mat has a regular rectangular shallow cross-section. The embedding material can either be a plastic material with closed pores or can also be a gypsum composition or a gypsum fiber composition. In both cases the embedding material leads to an insulation which is effective in a upward direction.

Figure 6:
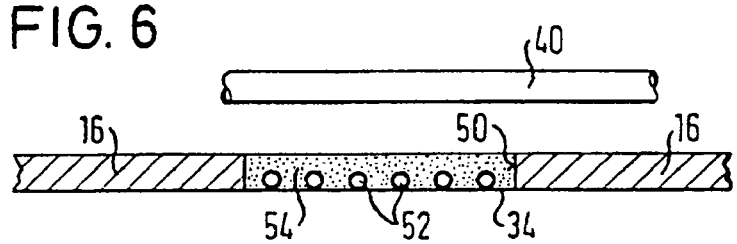
FIG. 6 is a section in accordance with the arrow VI—VI of FIG. 4.

FIG. 6 shows the corresponding arrangement at the right hand side of FIG. 4 where the cooling tube mat 34 is arranged in a cut-out 50 in the surface of the upper dry construction panel 16. The cooling tube mat 34 is, in this example, identical to the cooling tube mat of the embodiment of FIG. 5. It is evident that in both the embodiment of FIG. 5 and also the embodiment of FIG. 6 the cooling tubes have a circular cross-section and are fully embedded in the embedding material 54, with them however being arranged at the lower boundary of the embedding material 54. The cooling action downwardly is however improved relative to a possible such arrangement in which the cooling tubes 52 are arranged at the middle or in the top region of the embedding of the material 54.

Figure 7:
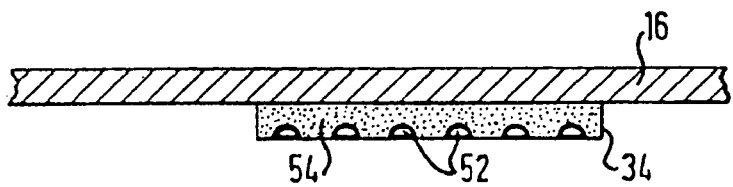
FIG. 7 is a modified variant of the embodiment of FIG. 5.
Figure 8:
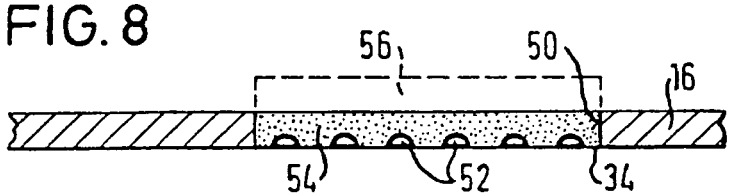
FIG. 8 is a modified variant of the embodiment of FIG. 6.

An even better cooling action results from the two embodiments of FIGS. 7 and 8. In the embodiment of FIG. 7 the cooling tube mat 34 is again located beneath the upper dry construction board 16 and can for example be adhesively bonded to the latter. The adhesive bond is easily possible since the embedding material 54 has a smooth surface and the adhesive can be applied in strips, pointwise or over the full area. The special feature of this embodiment is the fact that the cooling tubes 52 have, in this example, a downwardly flattened—specifically a D-shaped—cross-section so that a substantially larger area of the cooling tubes is arranged at the lower boundary of the cooling ceiling. In this way the cooling performance is improved.

In the embodiment of FIG. 7 the cooling tube mats 34 project downwardly with respect to the dry construction panel 16, this does not, however, have to be disturbing, but can rather represent a design feature of the ceiling, and indeed in particular when the cooling tube mats are laid out in accordance with a special pattern in order to produce special contrast effects.

FIG. 8 shows the cooling tube mat 34 of FIG. 7 with the cooling tubes having a D-shaped cross-section, which are arranged in a cut-out 50 of the upper dry construction panels, i.e. as shown in FIG. 6. The broken line 56 in FIG. 8 gives expression to the fact that the thickness of the embedding material can be increased in order to achieve a better insulation of the cooling tube mats in the upward direction.

Figure 9:
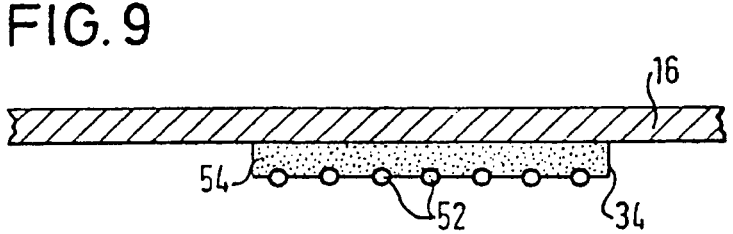
FIG. 9 is a further modified variant of the embodiment of FIG. 5.
Figure 10:
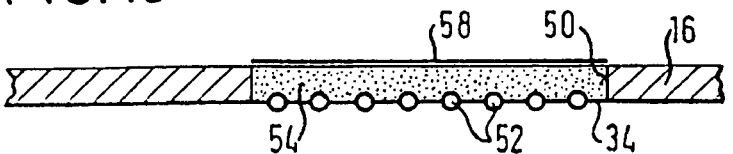
FIG. 10 is a further modified embodiment of the variant of FIG. 6.

FIGS. 9 and 10 show a further alternative of the cooling tube mat 34 in which the cooling tubes 52 indeed again have a circular cross-section but are only embedded up to half the height in the embedding material 54. Since an even larger surface of the cooling tube mat projects out from the lower side an even better cooling performance is achievable than with the corresponding embodiment of the previous FIGS. 7 and 8.

FIG. 10 shows a further alternative in which an aluminium foil is applied onto the upper surface of the embedding material 54 which further reduced the extent of the cooling flux in the upper direction. The aluminium foil 58 can be a simple aluminium foil but can also be a laminated aluminium foil or an aluminium foil with threads or grid-like reinforcing elements. An arrangement of this kind improves the holding together and also the ability to handle the cooling tube mats 34, which already represent a stable handleable arrangement as a result of the embedding material.

Figure 11:
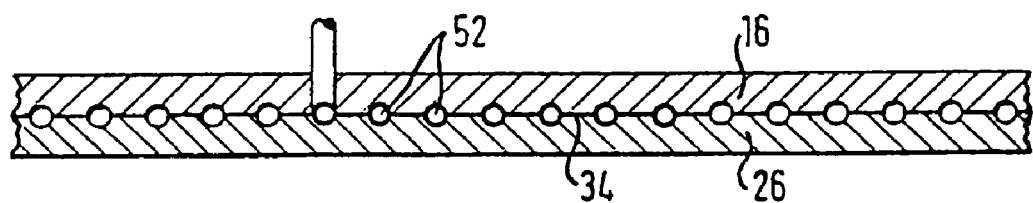
FIG. 11 is a further variant of a cooling ceiling in accordance with the invention.

FIG. 11 shows a somewhat different variant in which the cooling tube mat consists in principle only of the cooling tubes 52 with the tubes 52 extending strictly parallel to one another and come to lie in grooves in the lower side of the upper dry construction panels 16 and in the upper side of the lower dry construction panels 26. In this way the tubes—as in some of the other embodiments—are fully "embedded" so that no air flows enter into the region of the cooling tubes and the formation of condensation is largely suppressed.

Figure 12:
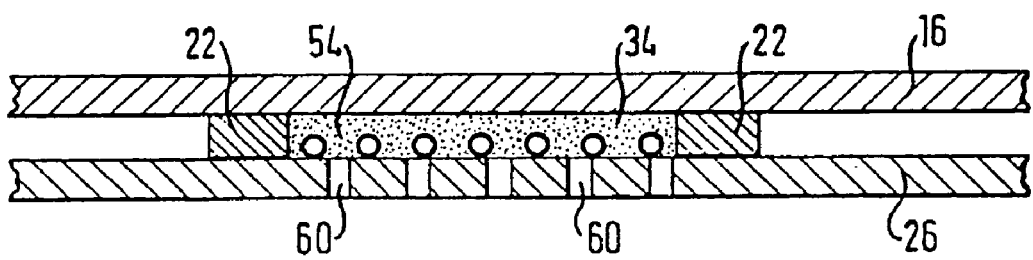
FIG. 12 is a yet further variant of a cooling ceiling in accordance with the invention.

FIG. 12 shows an arrangement which is in principle similar to the arrangement of FIGS. 1 and 2 of the present application. Here the cooling tube mat 34 is again accommodated in a hollow space between upper and lower dry construction panels 16 and 26, with the hollow space being formed by spacers 22. Interesting in this embodiment is the fact that the embedding material 54 prevents the entry of air into the region of the cooling tube mat 34 and thus also offers an effective protection against condensation.

FIG. 12 shows a yet further variant in which holes or openings 60 are provided in the lower dry construction panels 26 which extend up to the cooling tube mat. In this manner a good cooling action can be achieved. Although not shown in FIG. 12 the hole 60 can be provided in a regular pattern in the lower dry construction panels 26 or can merely be provided sectionwise, as is for example shown in FIG. 12.

Figure 13:
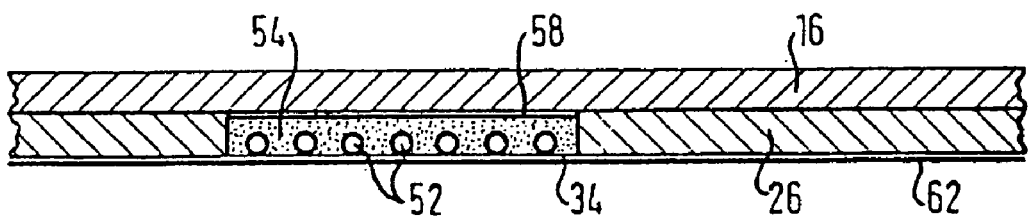
FIG. 13 is a further development of the embodiment of FIG. 5.

FIG. 13 shows an arrangement which is very similar to the embodiment of FIG. 5 but in which a distinction however lies in the fact that further dry construction panels 26 are arranged around the cooling tube mat 34. In this way a continuous lower surface is formed which is suitable for being provided with a covering 60. This covering 60 can simply represent a coat of paint, but can, however, also be a wallpaper or a glass fiber fabric and/or a layer of a so-called spray plaster.

Although the cooling tubes 52 have a circular cross-section in this embodiment, D-shaped cooling tubes in accordance with FIG. 7 can also be used, for example.

Yet another variant is shown in FIG. 13. An aluminium foil 58 is located above the cooling tube mat and is laid out in a manner which is explained in connection with FIG. 10. As an alternative to the embodiment of FIG. 10 the aluminium layer 58 can however here be provided on the lower side of the upper dry construction panel 16—instead of on the cooling tube mat 34—or can indeed be provided loosely between the cooling tube mat 34 and the lower side of the upper dry construction panel 16.

The variants of FIGS. 4 to 13 can be secured in the same way and means to ceilings as is described in conjunction with the embodiment of FIGS. 1 to 3.

What is claimed is:

1. A cooling ceiling comprising: cooling tube mats that may be attached by means of a carrying system to a bare ceiling; and separate upper and lower dry building panels arranged in a sandwiched construction and spaced apart from one another by spacers thereby forming shallow hollow cavities; wherein the cooling tube mats are located in the hollow cavities and the upper panels are provided with at least one of a thermal barrier and a thermally reflecting layer, said cooling ceiling further comprising a sound insulation located at least in a region of the lower panels in order to attenuate flow noises originating from the cooling tube mats, wherein the sound insulation consists of a sound insulating fleece arranged beneath the cooling tube mat on an upper side of the lower dry building panels.

2. A cooling ceiling in accordance with claim 1 wherein the cooling tube mats consist of plastic cooling tube mats.

3. A cooling ceiling in accordance with claim 1 wherein the upper and lower dry building panels consist of fire resistant dry building panels.

4. A cooling ceiling in accordance with claim 3 wherein the fire resistant dry building panels consist of one of sandwich-type plaster board panels or gypsum fiber board panels.

5. A cooling ceiling in accordance with claim 1 wherein the upper panels are provided with a thermally reflecting layer consisting of a foil of aluminum.

6. A cooling ceiling in accordance with claim 1 wherein the upper and lower dry building panels and the spacers consist of pre-manufactured elements.

7. A cooling ceiling in accordance with claim 6 wherein the pre-manufactured elements that receive the cooling tube mats and hollow cavities each comprise an upper dry building panel, a lower dry building panel and at least two bar-like spacers.

8. A cooling ceiling in accordance with claim 7 wherein the pre-manufactured elements further include the thermal barrier and the sound insulation.

9. A cooling ceiling in accordance with claim 7 wherein not every premanufactured element is provided with a cooling tube mat.

10. A cooling ceiling in accordance with claim 6 wherein the pre-manufactured elements may be directly attached to the bare ceiling.

11. A cooling ceiling in accordance with claim 6 wherein the pre-manufactured elements may be attached to the bare ceiling by means of one of nails or screws to a lath arrangement attached to the bare ceiling.

12. A cooling ceiling in accordance with claim 6 wherein the pre-manufactured elements may be suspended from the bare ceiling.

13. A cooling ceiling in accordance with claim 12 wherein the pre-manufactured elements are suspended from the bare ceiling by means of hangers for CD sections, wherein the CD sections may be attached to the hangers and the elements may be attached to the CD sections.

14. A cooling ceiling in accordance with claim 13 wherein points of attachment for the CD sections arranged on the hangers have fixed spacings from one another, and wherein the premanufactured elements have dimensions in a length direction and in a width direction that are matched to the fixed spacings.

15. A cooling ceiling in accordance with claim 1 wherein the attachment of the upper and lower panels to one another takes place at positions at which spaces are provided.

16. A cooling ceiling in accordance with claim 1 wherein the lower dry building panels are provided with holes.

* * * * *